Jan. 5, 1926.
H. LAWRANCE
COW TAIL HOLDER
Filed Sept. 2, 1925
1,568,747
FIG. 1.
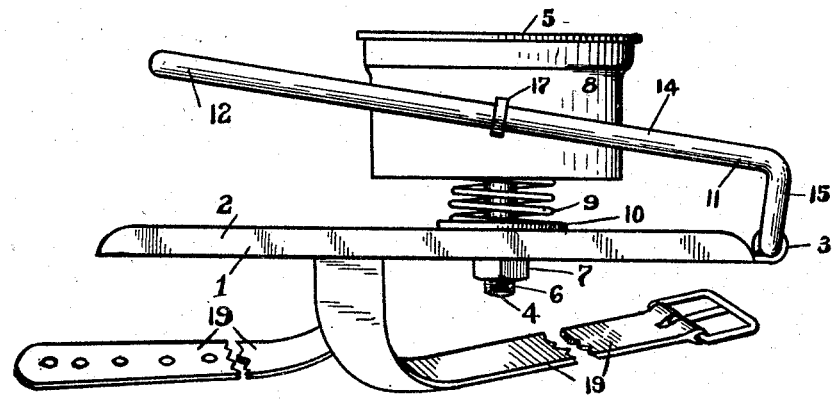
FIG. 2.
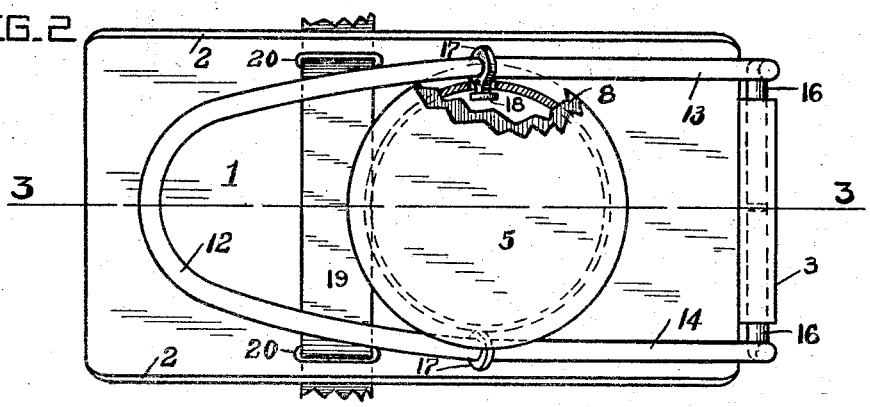
FIG. 3.
FIG. 4.
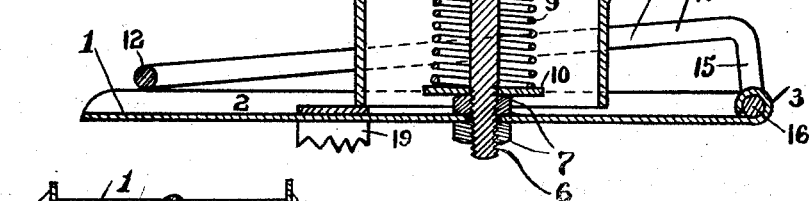
Inventor,
Henry Lawrance
By, Frederick C. Bromley
Atty.

Patented Jan. 5, 1926.

1,568,747

UNITED STATES PATENT OFFICE.

HENRY LAWRANCE, OF BIRTLE, MANITOBA, CANADA.

COW-TAIL HOLDER.

Application filed September 2, 1925. Serial No. 54,092.

*To all whom it may concern:*

Be it known that I, HENRY LAWRANCE, a subject of the King of Great Britain, resident of the town of Birtle, in the Province of Manitoba, in the Dominion of Canada, have invented new and useful Improvements in Cow-Tail Holders, of which the following is a specification.

The invention relates to improvements in cow tail holders as described in the present specification and shown in the accompanying drawings which form part of the same.

The invention has for its object to provide a new and useful device for the purpose of anchoring a cow's tail to the leg of the party milking it in order to prevent the petty annoyance arising from the cow flicking its tail onto the person of the milker.

The invention consists of a plate for attachment to the leg of a milker upon which is mounted a rigid and a movable jaw, between which jaws the tail is held by gripping pressure supplied by a compression spring bearing against the movable jaw, the opening of which jaw for the purpose of receiving and releasing the tail is accomplished by a manually operated lever pivoted to the aforesaid plate.

In the drawings, Figure 1 is a side elevation of the invention depicting a strap for buckling to the leg of a person.

Figure 2 is a plan view thereof viewed from the top and showing a portion of both jaws broken away in order to disclose the method of attaching the lever to the movable jaw.

Figure 3 is a vertical sectional view taken on the line 3—3 of Figure 2 exhibiting the jaws open ready to receive the tail of a cow and also showing the fastening strap broken away.

Figure 4 is a slightly modified form of the fastening means.

Like numerals of reference indicate corresponding parts in each figure throughout the drawings.

In the drawings, the reference numeral 1 indicates a flat plate of rectangular shape, having its side edges upturned in order to form flanges 2 for the purpose of adding rigidity to the plate.

One end of the plate is cut away at its corners and curled around so as to form a tubular bearing 3. Rising from the plate is a shank 4 terminating in a substantial circular and flat head 5, constituting a rigid jaw.

The shank 4 is preferably connected to the plate by threading its lower extremity as at 6 and passing it through an aperture therein and securing it by a pair of nuts 7, one upon each side of the plate.

8 is an inverted cup-shaped jaw encircling the shank 4 and capable of being reciprocated thereon, said jaw being urged into engagement with the rigid jaw 5 by a substantial spring 9 which is seated at one end against a collar 10.

11 is a lever comprising a U-shaped rod, the bight of which constitutes a handle as at 12, while the arms 13 and 14 are bent at their ends at right angles to their length for a short distance, as at 15, and then bent inwardly towards each other, as at 16. The ends 16 of this lever are inserted in the tubular bearing 3 in order to serve as a pivot.

17 are eye-bolts, one of which encircles each of the arms 13 and 14 of the lever and pass through apertures in the sides of the movable jaw, the ends of such eye bolts being headed as at 18.

By this construction it will be seen that to grip the cow's tail, it is simply necessary to manually depress the lever by its handle end 12, which opens the movable jaw 8 a sufficient distance to receive the tail. Upon releasing the lever, the spring 9 closes this jaw securely gripping the tail.

It is intended that this device shall be fastened to the leg of the milker, preferably near his knee, and, with this object in view, an ordinary flexible strap 19 is provided which is attached to the plate 1 by threading it through a pair of elongated apertures 20, as clearly discernible in Figure 2.

It will be manifest that this construction is essentially applicable to a male milker, as in use by a woman it will be evident that some variation of attachment will be required owing to the interference which her skirt would present to such mode of connection. Figure 4 illustrates a slightly modified form of attachment to replace the strap hereinbefore mentioned. Such modified form consists of a substantially C-shaped clamp 21 constructed of spring metal and rigidly attached to the underside of the plate 1 either by rivets or otherwise convenient. It will be observed that this clamp will readily fit over both the skirt and limb of a female milker.

What I claim is:—

1. In a cow tail holder, a jaw supporting unit, a rigid jaw mounted thereupon, a slidable jaw coacting therewith mounted for movement to and away therefrom, a spring for applying pressure to said movable jaw, and a lever fulcrumed on the aforesaid supporting unit and pivoted to said movable jaw for the purpose specified.

2. In a cow tail holder, a jaw supporting unit, a shank rising therefrom, a rigid jaw carried by said shank, a coacting slidable jaw mounted upon said shank for movement to and away from said rigid jaw, a spring for applying pressure to said movable jaw, and a lever fulcrumed on the aforesaid supporting unit and pivoted to said movable jaw for the purpose specified.

3. In a cow tail holder, a supporting plate, a shank rising therefrom, a rigid jaw carried by said shank, a coacting slidable jaw encircling said shank for movement to and away from said rigid jaw, a spring for applying pressure to said movable jaw, and a lever fulcrumed on the aforesaid plate and pivoted to said movable jaw for the purpose specified.

4. In a cow tail holder, a supporting plate, a shank rising therefrom, a flat rigid jaw carried by said shank, an inverted cup-shaped jaw encircling said shank for movement to and from said rigid jaw, a coil spring encircling said shank and bearing against said movable jaw, and a lever fulcrumed on the aforesaid plate and pivoted to said movable jaw for the purpose specified.

5. In a cow tail holder, a supporting plate, a shank rising therefrom, a flat rigid jaw carried by said shank, an inverted cup-shaped jaw encircling said shank for movement to and from said rigid jaw, a coil spring encircling said shank and bearing against said movable jaw, and a lever comprising a substantially U-shaped rod having its ends bent inwardly and fulcrumed in the aforesaid plate, the arms of said lever being pivoted to opposing sides of said movable jaw medially of their length.

6. In a cow tail holder, a supporting plate, a shank rising therefrom, a flat rigid jaw carried by said shank, an inverted cup-shaped jaw encircling said shank for movement to and away from said rigid jaw, a coil spring encircling said shank and bearing against said movable jaw, a lever fulcrumed on the aforesaid plate and pivoted to said movable jaw, and a flexible strap threaded through apertures provided in said plate for the purpose specified.

Signed at Birtle, Manitoba, Canada, this 8th day of August, 1925.

HENRY LAWRANCE.